US010976894B2

(12) United States Patent
Kikumoto (10) Patent No.: US 10,976,894 B2
(45) Date of Patent: Apr. 13, 2021

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Takashi Kikumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 230 days.

(21) Appl. No.: 15/446,411

(22) Filed: Mar. 1, 2017

(65) Prior Publication Data

US 2018/0032218 A1 Feb. 1, 2018

(30) Foreign Application Priority Data

Jul. 28, 2016 (JP) ................. 2016-148270

(51) Int. Cl.
*G06F 3/0482* (2013.01)
*G06F 16/9038* (2019.01)
(Continued)

(52) U.S. Cl.
CPC ........ *G06F 3/0482* (2013.01); *G06F 3/04855* (2013.01); *G06F 3/1204* (2013.01); *G06F 3/1263* (2013.01); *G06F 3/1285* (2013.01); *G06F 16/9038* (2019.01); *G06F 16/90335* (2019.01); *G06F 3/017* (2013.01); *G06F 3/0488* (2013.01); *G06F 3/04842* (2013.01); *G06F 3/04883* (2013.01); *G06F 3/1203* (2013.01); *G06F 3/126* (2013.01); *G06F 3/1286* (2013.01); *G06F 3/1296* (2013.01); *G06F 16/2428* (2019.01)

(58) Field of Classification Search
CPC ............ G06F 3/04883; G06F 3/04842; G06F 3/0482; G06F 3/017
See application file for complete search history.

(56) References Cited

U.S. PATENT DOCUMENTS 6,484,190 B1 * 11/2002 Cordes ................ G06F 16/9027
715/207
7,551,188 B2 * 6/2009 Ahokas ................ G06F 3/0485
345/684
(Continued)

FOREIGN PATENT DOCUMENTS

JP S64-077546 A 3/1989
JP 2005-317024 A 11/2005
(Continued)

OTHER PUBLICATIONS

Dec. 1, 2017 Office Action issued in Australian Patent Application No. 2017202785.
(Continued)

*Primary Examiner* — Jordany Nunez
(74) *Attorney, Agent, or Firm* — Oliff PLC (57) ABSTRACT

An information processing apparatus includes a first receiving unit that receives a selected item included in a list being displayed, a second receiving unit that receives a setting of search criteria, and an updating unit that updates, if the selected item satisfies the search criteria that are set after the item is selected, a display of the list such that search results obtained under the search criteria are displayed and that a state that the item is selected is maintained.

20 Claims, 5 Drawing Sheets

(51) Int. Cl.
  *G06F 16/903* (2019.01)
  *G06F 3/12* (2006.01)
  *G06F 3/0485* (2013.01)
  *G06F 3/01* (2006.01)
  *G06F 3/0484* (2013.01)
  *G06F 16/242* (2019.01)
  *G06F 3/0488* (2013.01)

(56) References Cited

U.S. PATENT DOCUMENTS

| | | | |
|---|---|---|---|
| 7,908,559 B1* | 3/2011 | Denise | G06F 16/9038 |
| | | | 715/738 |
| 8,977,982 B1* | 3/2015 | Amacker | G06F 3/014 |
| | | | 715/787 |
| 9,268,469 B2* | 2/2016 | Li | G06F 3/04842 |
| 9,910,582 B2* | 3/2018 | Amacker | G06F 3/048 |
| 2004/0143564 A1* | 7/2004 | Gross | G06Q 10/107 |
| 2006/0101347 A1* | 5/2006 | Runov | G06F 3/0482 |
| | | | 715/764 |
| 2008/0155461 A1* | 6/2008 | Ozaki | G06F 3/0485 |
| | | | 715/784 |
| 2011/0219333 A1 | 9/2011 | Park | |
| 2012/0054656 A1* | 3/2012 | Nurmi | G06F 3/0482 |
| | | | 715/769 |
| 2015/0116756 A1* | 4/2015 | Mori | G06F 3/1204 |
| | | | 358/1.14 |
| 2015/0156370 A1 | 6/2015 | Ichikawa | |
| 2016/0179881 A1* | 6/2016 | Kubo | G06F 16/245 |
| | | | 707/752 |
| 2019/0155958 A1* | 5/2019 | Lal | G06F 16/953 |

FOREIGN PATENT DOCUMENTS

| | | |
|---|---|---|
| JP | 2008-257580 A | 10/2008 |
| JP | 2015-108961 A | 6/2015 |
| JP | 2015-162035 A | 9/2015 |

OTHER PUBLICATIONS

Dec. 17, 2019 Office Action issued in Japanese Patent Application No. 2016-148270.

Oct. 3, 2019 Office Action issued in Australian Patent Application No. 2018271394.

* cited by examiner

STORED: 1600 ITEMS

| ID | JOB NAME | SIZE | INFORMATION | RECEPTION START TIME AND DATE | COPY COUNT | NUMBER OF PAGES OF ORIGINAL DOCUMENT |
|---|---|---|---|---|---|---|
| 30 | 6page.pdf | 8KB | ☐ | 3/25/2016 1:32:42 PM | 1 | 6 |
| 200 | 8page.pdf(3) | 9KB | | 3/25/2016 1:32:46 PM | 1 | 8 |
| 388 | 8page.pdf(4) | 9KB | | 3/25/2016 1:32:46 PM | 1 | 8 |
| 389 | 8page.pdf(1)(3) | 9KB | | 3/25/2016 1:32:46 PM | 1 | 8 |
| 764 | 8page.pdf(5) | 9KB | | 3/25/2016 1:32:46 PM | 1 | 8 |
| 765 | 8page.pdf(1)(4) | 9KB | | 3/25/2016 1:32:46 PM | 1 | 8 |
| 766 | 8page.pdf(1)(1)(3) | 9KB | | 3/25/2016 1:32:46 PM | 1 | 8 |
| 768 | 8page.pdf(3)(2) | 9KB | | 3/25/2016 1:32:46 PM | 1 | 8 |
| 1516 | 8page.pdf(6) | 9KB | | 3/25/2016 1:32:46 PM | 1 | 8 |
| 1517 | 8page.pdf(1)(5) | 9KB | | 3/25/2016 1:32:46 PM | 1 | 8 |
| 1518 | 8page.pdf(1)(1)(4) | 9KB | | 3/25/2016 1:32:46 PM | 1 | 8 |
| 1520 | 8page.pdf(3)(3) | 9KB | | 3/25/2016 1:32:46 PM | 1 | 8 |
| 1521 | 8page.pdf(1)(2)(3) | 9KB | | 3/25/2016 1:32:46 PM | 1 | 8 |
| 1522 | 8page.pdf(1)(1)(1)(3) | 9KB | | 3/25/2016 1:32:46 PM | 1 | 8 |

FIG. 6

| ID | JOB NAME | SIZE | INFORMATION | RECEPTION START TIME AND DATE | COPY COUNT | NUMBER OF PAGES OF ORIGINAL DOCUMENT |
|---|---|---|---|---|---|---|
| 30 | 6page pdf | 8KB | ☐ | 3/25/2016 1:32:42 PM | 1 | 6 |
| 200 | 8page pdf(3) | 9KB | | 3/25/2016 1:32:46 PM | 1 | 8 |
| 388 | 8page pdf(4) | 9KB | | 3/25/2016 1:32:46 PM | 1 | 8 |
| 389 | 8page pdf(1)(3) | 9KB | | 3/25/2016 1:32:46 PM | 1 | 8 |
| 764 | 8page pdf(5) | 9KB | | 3/25/2016 1:32:46 PM | 1 | 8 |
| 765 | 8page pdf(1)(4) | 9KB | | 3/25/2016 1:32:46 PM | 1 | 8 |
| 766 | 8page pdf(1)(1)(3) | 9KB | | 3/25/2016 1:32:46 PM | 1 | 8 |
| 768 | 8page pdf(3)(2) | 9KB | | 3/25/2016 1:32:46 PM | 1 | 8 |
| 1516 | 8page pdf(6) | 9KB | | 3/25/2016 1:32:46 PM | 1 | 8 |
| 1517 | 8page pdf(1)(5) | 9KB | | 3/25/2016 1:32:46 PM | 1 | 8 |
| 1518 | 8page pdf(1)(1)(4) | 9KB | | 3/25/2016 1:32:46 PM | 1 | 8 |
| 1520 | 8page pdf(3)(3) | 9KB | | 3/25/2016 1:32:46 PM | 1 | 8 |
| 1521 | 8page pdf(1)(2)(3) | 9KB | | 3/25/2016 1:32:46 PM | 1 | 8 |
| 1522 | 8page pdf(1)(1)(1)(3) | 9KB | | 3/25/2016 1:32:46 PM | 1 | 8 |

STORED: 1600 ITEMS
ENTER JOB NAME
DETAILED SEARCH
SELECT TAG

FIG. 7

| ID | JOB NAME | SIZE | INFORMATION | RECEPTION START TIME AND DATE | COPY COUNT | NUMBER OF PAGES OF ORIGINAL DOCUMENT |
|---|---|---|---|---|---|---|
| 764 | 8page pdf(5) | 9KB | | 3/25/2016 1:32:46 PM | 1 | 8 |
| 1596 | 9page pdf(5)(1) | 10KB | | 3/25/2016 1:32:48 PM | 1 | 9 |
| 1581 | 9page pdf(1)(5) | 10KB | | 3/25/2016 1:32:48 PM | 1 | 9 |
| 796 | 9page pdf(5) | 10KB | | 3/25/2016 1:32:48 PM | 1 | 9 |
| 1453 | 7page pdf(1)(5) | 10KB | | 3/25/2016 1:32:44 PM | 1 | 10 |
| 1468 | 7page pdf(5)(1) | 10KB | | 3/25/2016 1:32:44 PM | 1 | 10 |
| 732 | 7page pdf(5) | 10KB | | 3/25/2016 1:32:44 PM | 1 | 10 |
| 924 | 10page pdf(5)(1) | 10KB | | 3/25/2016 1:32:16 PM | 1 | 10 |
| 909 | 10page pdf(1)(5) | 10KB | | 3/25/2016 1:32:16 PM | 1 | 10 |
| 460 | 10page pdf(5) | 10KB | | 3/25/2016 1:32:16 PM | 1 | 10 |
| 1116 | 30page pdf(5)(1) | 19KB | | 3/25/2016 1:32:29 PM | 1 | 30 |
| 1101 | 30page pdf(1)(5) | 19KB | | 3/25/2016 1:32:29 PM | 1 | 30 |
| 556 | 30page pdf(5) | 19KB | | 3/25/2016 1:32:29 PM | 1 | 30 |
| 1261 | 50page pdf(1)(5) | 28KB | | 3/25/2016 1:32:38 PM | 1 | 50 |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-148270 filed Jul. 28, 2016.

BACKGROUND

(i) Technical Field

The present invention relates to an information processing apparatus, an information processing method, and a non-transitory computer readable medium.

(ii) Related Art

One or more items may be selected in a displayed list using a pointing device. The displayed list may be any list as long as the list is output from an information processing apparatus. For example, the display lists may include a list of errors that have occurred in the information processing device, a list of print commands stored on a spooler, and a list of print commands that have been executed. A selected item may have an appearance different from that of an unselected item (for example, the color of characters and the color of the background are inverted with each other). The selected item is thus determined by the appearance thereof. The phrase "print command" herein includes a print job. The print data may include page description language (PDL) print data, or data that includes not only the print data but also attribute information that specifies an output form of imposition processing when the print data is printed. In other words, the print command is not intended to simply mean a command that instructs printer to print.

If the search is performed by setting the search criteria, the list is updated to a list of items that satisfy the set search criteria. If the item that is selected prior to the search does not satisfy the search criteria, that item is not naturally included in an updated list. That item, if satisfying the search criteria, is not different in appearance in the updated list. The item having been selected prior to the search is not differentiated.

SUMMARY

According to an aspect of the invention, there is provided an information processing apparatus. The information processing apparatus includes a first receiving unit that receives a selected item included in a list being displayed, a second receiving unit that receives a setting of search criteria, and an updating unit that updates, if the selected item satisfies the search criteria that are set after the item is selected, a display of the list such that search results obtained under the search criteria are displayed and that a state that the item is selected is maintained.

BRIEF DESCRIPTION OF THE DRAWINGS

Exemplary embodiment of the present invention will be described in detail based on the following figures, wherein.

DETAILED DESCRIPTION

An exemplary embodiment of the present invention is described below.

Figure 1:
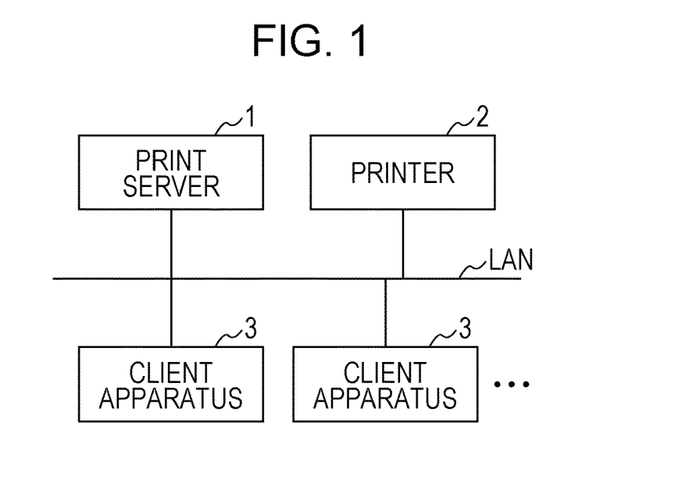
FIG. 1 generally illustrates a configuration of an exemplary embodiment.

FIG. 1 generally illustrates a configuration of an exemplary embodiment. A local-area network (LAN) connects to a print server 1, a printer 2, and plural client apparatuses 3. The print server 1 is an example of an information processing apparatus of the exemplary embodiment of the present invention. The print server 1 includes a spooler, stores a print command received from the client apparatus 3 onto the spooler, and outputs to the printer 2 the print commands in the order of reception.

Figure 2:
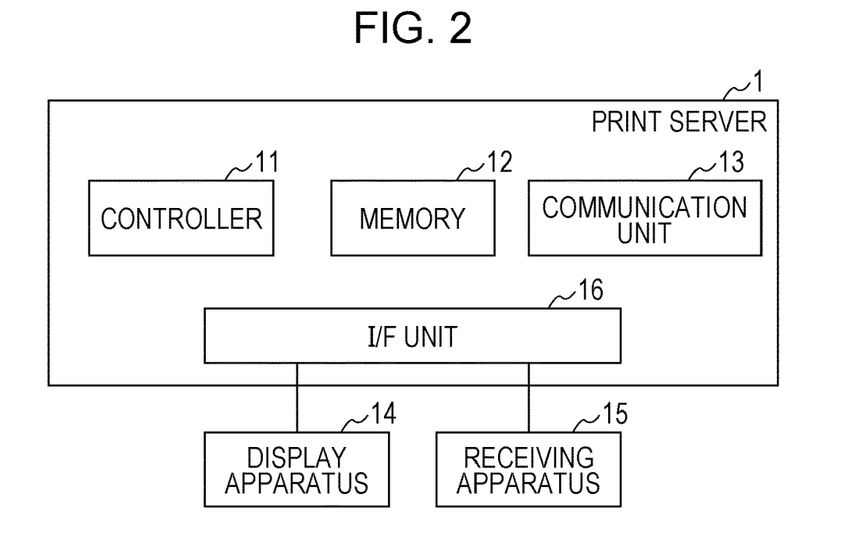
FIG. 2 is a functional block diagram illustrating a hardware configuration of the print server.

FIG. 2 is a functional block diagram illustrating a hardware configuration of the print server 1. A controller 11 includes an arithmetic device, and a storage device, such as a central processing unit (CPU), a read-only memory (ROM), and a random-access memory (RAM). The ROM stores firmware that describes a startup procedure of hardware and an operating system (OS), The RAM stores data used when the CPU performs an arithmetic operation. The memory 12 includes a hard disk storage device or a semiconductor memory, and stores the OS and application programs. The communication unit 13 is a communication interface (I/F) that connects the print server 1 to a communication medium, such as the LAN.

The print server 1 connects to a display apparatus 14 and a receiving apparatus 15. The display apparatus 14 includes a liquid-crystal display device, and displays thereon a screen, such as a graphic user interface (GUI) with which a user operates the print server 1. The receiving apparatus 15 includes a keyboard and a pointing device, for example, and receives an operation performed by the user and outputs information responsive to the operation to the controller 11. The pointing device may be a mouse, a touchpad, or a touchpanel that is overlaid on the display screen of the display apparatus 14. The display apparatus 14 and the receiving apparatus 15 may be integrated with the print server 1. The print server 1 may be included in the printer 2.

Figure 3:
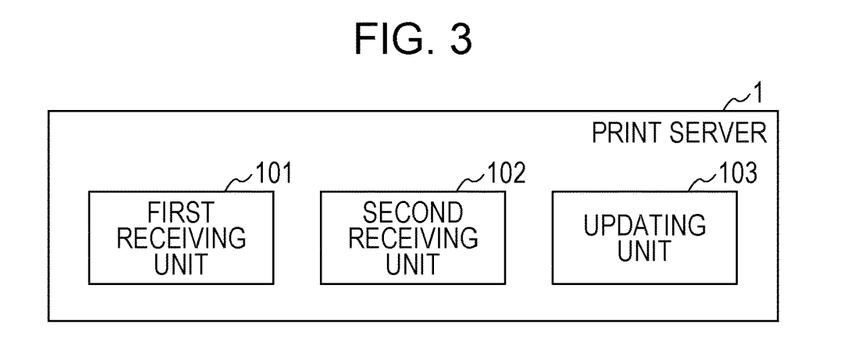
FIG. 3 is a functional block diagram illustrating the print server.

FIG. 3 is a functional block diagram illustrating the print server 1. The print server 1 includes a first receiving unit 101, a second receiving unit 102, and an updating unit 103. The first receiving unit 101 receives an item included in a currently displayed list. The second receiving unit 102 receives a setting of search criteria. If the item satisfies the search criteria that are set after the item is selected, the updating unit 103 updates the display of the list to display search results obtained under the search criteria and to maintain a state that the item is selected. Specific examples of processes that are implemented by this configuration are described, below.

Figure 4:
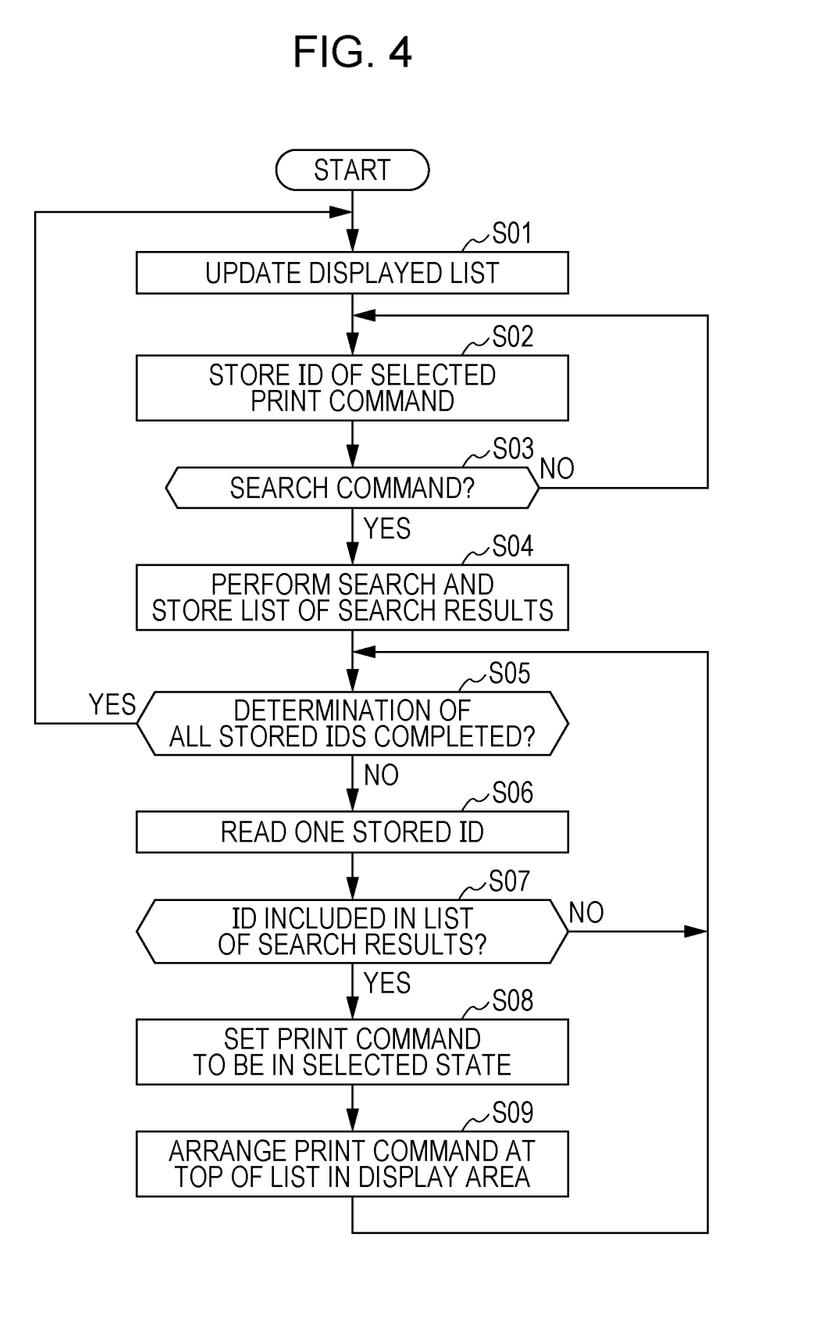
FIG. 4 illustrates a list displaying process performed by the print server.

FIG. 4 illustrates a list displaying process performed by the print server 1. In accordance with the exemplary embodiment, the information processing apparatus handles as a target of the list displaying process a variety of lists output by the information processing apparatus. In accordance with this exemplary embodiment, however, the target of the list displaying process is a list of print commands stored on a spooler, for example. Each of the print commands included in the list is an example of an item included in the list. An application program describing the list displaying process is installed on the print server 1. When a user gives a command stored on the spooler to display the list of print commands to the print server 1, the controller 11 in the print server 1 performs the following operations in accordance with the application program.

Step S01

Figure 5:
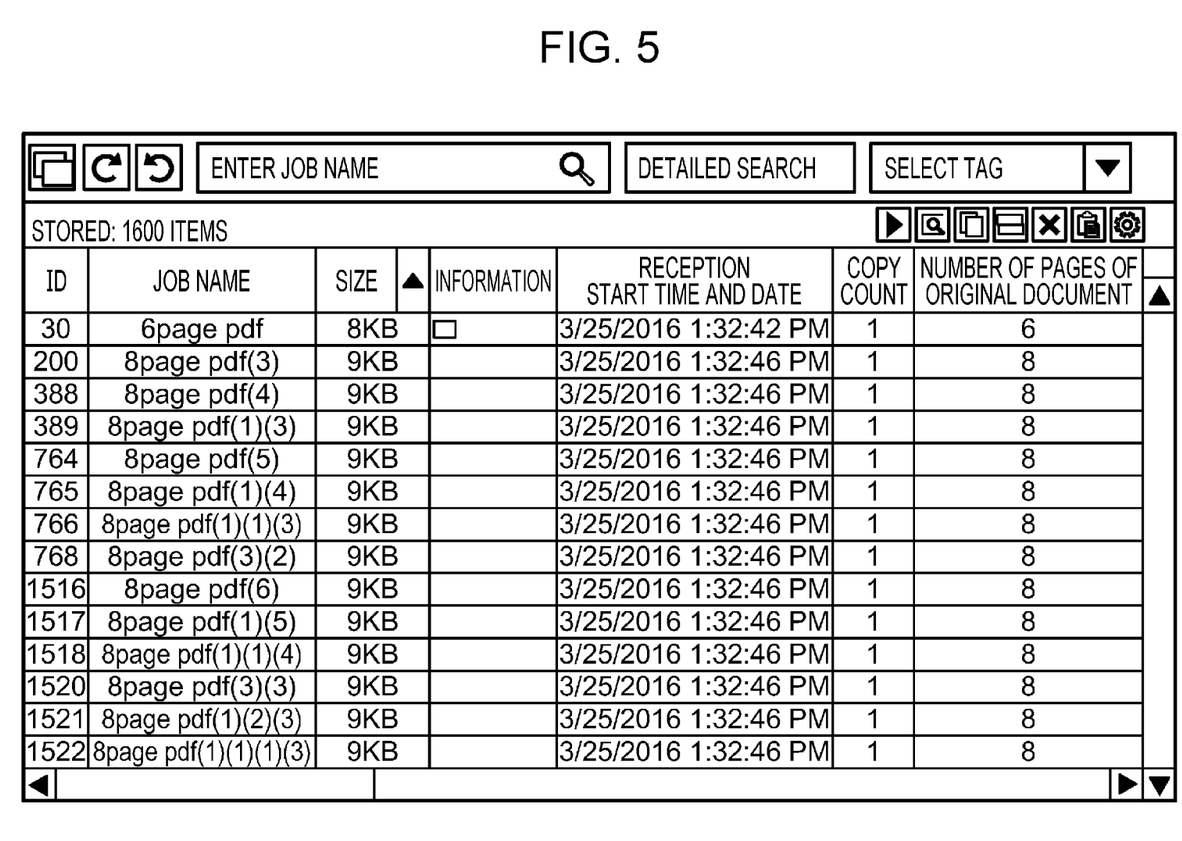
FIG. 5 illustrates example of a displayed list.

The controller 11 updates the display of the list. This operation is described in detail below. In step S01 of a first round after the start of the list displaying process, operations in step S02 and subsequent steps are not yet performed. The controller 11 generates a list that includes the print commands stored on the spooler and arranged in the order specified in an initial setting (for example, the order of time and date according to which the print server 1 starts receiving each of the print commands), and causes the display apparatus 14 to display the list. In step S01 of a second round thereafter of the list displaying process, the controller 11 updates the display of the list in response to the results of operations in step S02 and subsequent steps, FIG. 5 illustrates an example of a displayed list. Specifically, FIG. 5 illustrates a display example in step S01 of the first round subsequent to the start of the list displaying process, namely, illustrates a state before the user selects a print command. Each of the print commands stored on the spooler is associated with information, such as an "identifier (ID)", "job name", "size", "reception start time and date", "copy count", and "number of pages of an original document" (hereinafter referred to as related information). Contents of the list actually displayed are the related information. The ID is an identifier unique to each of the print commands. The "job name" is a name attached to each print command. The "size" is an amount of data of each print command. The "reception start time and date" is time and date on which the print server 1 starts receiving the print command. In this example, a display area for 14 items is provided. If the number of print commands that is too many to fit into the display area is included in the list, print commands falling within the display area, starting with the top print command in the list, are displayed first (14 items in this example), and the remaining print commands are displayed by scrolling the screen. The screen may be scrolled using a scroll bar or a wheel of a mouse.

Step S02

The controller 11 stores the ID of the selected print command onto the RAM. More specifically, the controller 11 extracts the print command selected from the displayed list. The user may select the print command using the receiving apparatus 15 (a mouse, a touchpad, a touchpanel, a curuor key of a keyboard, or a return key of the keyboard). The controller 11 receives the information indicating the selected print command (an example of the first receiving unit 101). The controller 11 attaches to the selected print command an appearance different from that of the unselected print command. The controller 11 stores, in an associated form on the RAM, the ID of the selected print command and information (order information) indicating the order according to which the ID is selected subsequent to the start of the list displaying process. A set of the ID and the order information stored on the RAM is called selection intiation.

Figure 6:
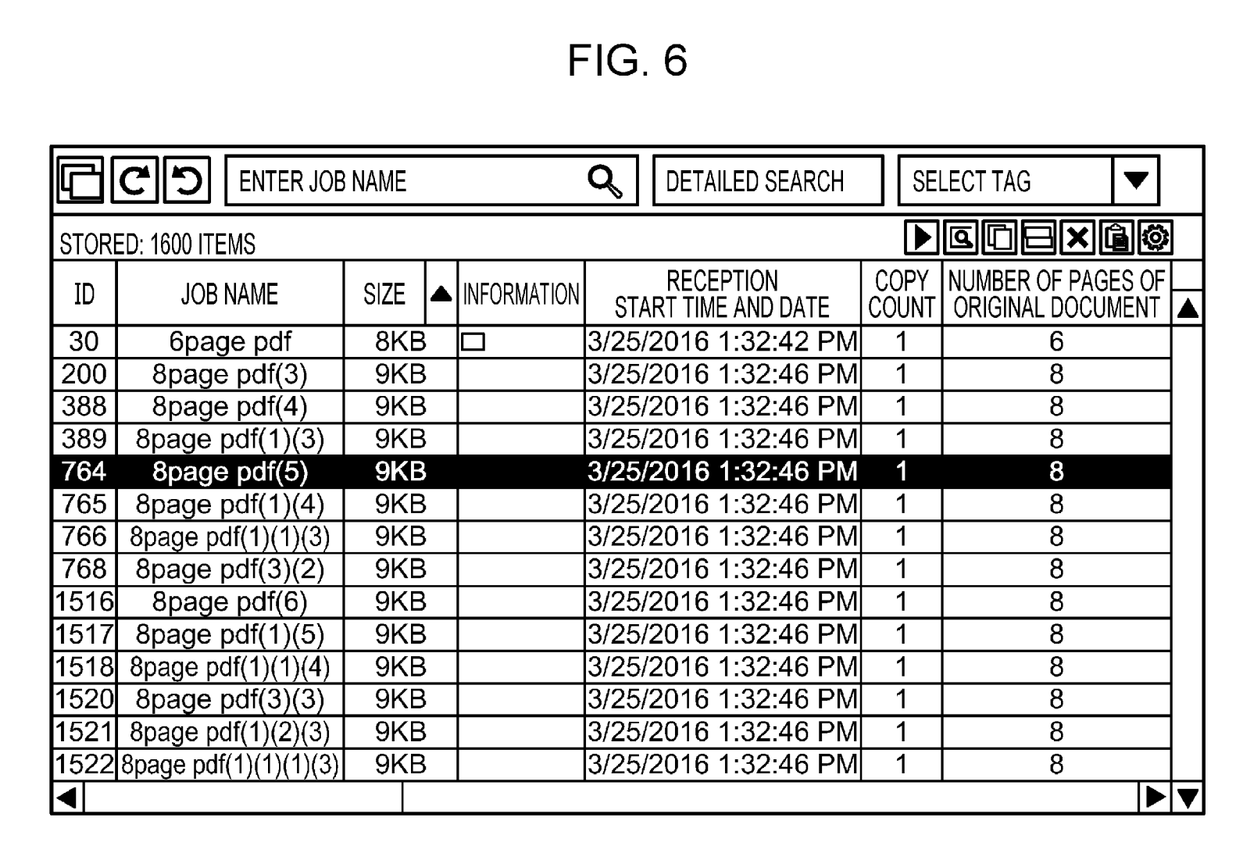
FIG. 6 illustrates how a print command is selected.

FIG. 6 illustrates how a print command is selected. Referring to FIG. 6, the selected print command is displayed with the color of the characters and the background color reversed (in reverse video). Since the print command responsive to ID "764" is selected, the controller 11 stores on the RAM the selection information that associates ID "764" with the order information. When the user performs an operation to select the selected print command again, the selection is canceled. More specifically, the controller 11 causes the appearance of the print command to revert back to the appearance before the selection, and deletes the selection information responsive to the print command from the RAM.

Step S03

The controller 11 determines whether a search command is present. More specifically, a text box located on the left hand side above the list (the text box "ENTER JOB NAME") is a partition that receives the search criteria. If the search criteria are input and a "DETAILED SEARCH" button is pressed, the controller 11 determines that the search command has been issued, and receives the setting of the search criteria (an example of the second receiving unit 102). If the search command has been issued (yes branch from step S03), the controller 11 proceeds to step S04. If the search command has not been issued (no branch from step S03), the controller 11 returns to step S02.

Step S04

The controller 11 performs the search and stores the list indicating the search results. More specifically, the controller 11 extracts from the spooler the print command that satisfies the set search criteria, generates the list including the extracted print commands, and stores the generated list on the memory 12. Each print command included in the list is associated with a selection state flag. The initial value of the selection state flag is "0". The selection state flag of "0" indicates that the print command is not selected.

Step S05

The controller 11 determines whether the determination of all IDs stored on the RAM has been completed. More specifically, using a counter, the controller 11 counts the number of determination operations performed in step S07 after the start of the list displaying process. The controller 11 compares the count value with the number of pieces of selected information stored on the RAN. If the count value reaches the number of pieces of selected information, the controller 11 determines that the determination of all the IDs stored on the RAM has been completed. If the determination of all the IDs stored on the RAM has been completed (yes from step S05), the controller 11 returns to step S01. If the determination of all the IDs stored on the RAM has not been completed (no branch from step S05), the controller 11 proceeds to step S06.

Step S06

The controller 11 reads the IDs stored on the RAM one by one. More specifically, the controller 11 reads the ID corresponding to the order information equal to (count value+1) from the RAM.

Step S07

The controller 11 determines whether the ID is included in the list of search results. More specifically, if the ID read in step S06 is included in the list generated in step S04, the controller 11 determines that the ID is included in the list of search results. If the ID is included in the list of search results (yes branch from step S07), the controller 11 proceeds to step S08. If the ID is not included in the list of search results (no branch from step S07), the controller 11 returns to step S05.

Step S08

The controller 11 sets the print command to be in a selected state. More specifically, the controller 11 rewrites as "1" the selection state flag associated with the ID that has been determined to be included in the list of search results in step S07, Step S09

The controller 11 locates the print command at the top of the list. More specifically, the controller 11 locates at the to of the list the print command corresponding to the ID that has been determined to be in the list of search results in step S07. Upon completing this operation, the controller 11 returns to step S05.

If the determination of all the IDs stored on the RAM has been completed in step S05 (yes branch from step S05), the controller 11 returns to step S01. In step S01, the controller 11 updates the display of the list (an example of the updating unit 103) The controller 11 attaches an appearance, different from the appearance of the print command having a selection state flag of "0" to the print command having a selection state flag of "1", and displays from the top of the list downward the print commands. Note that the number of print commands herein is equal to the number of rows the splay area has.

Figure 7:
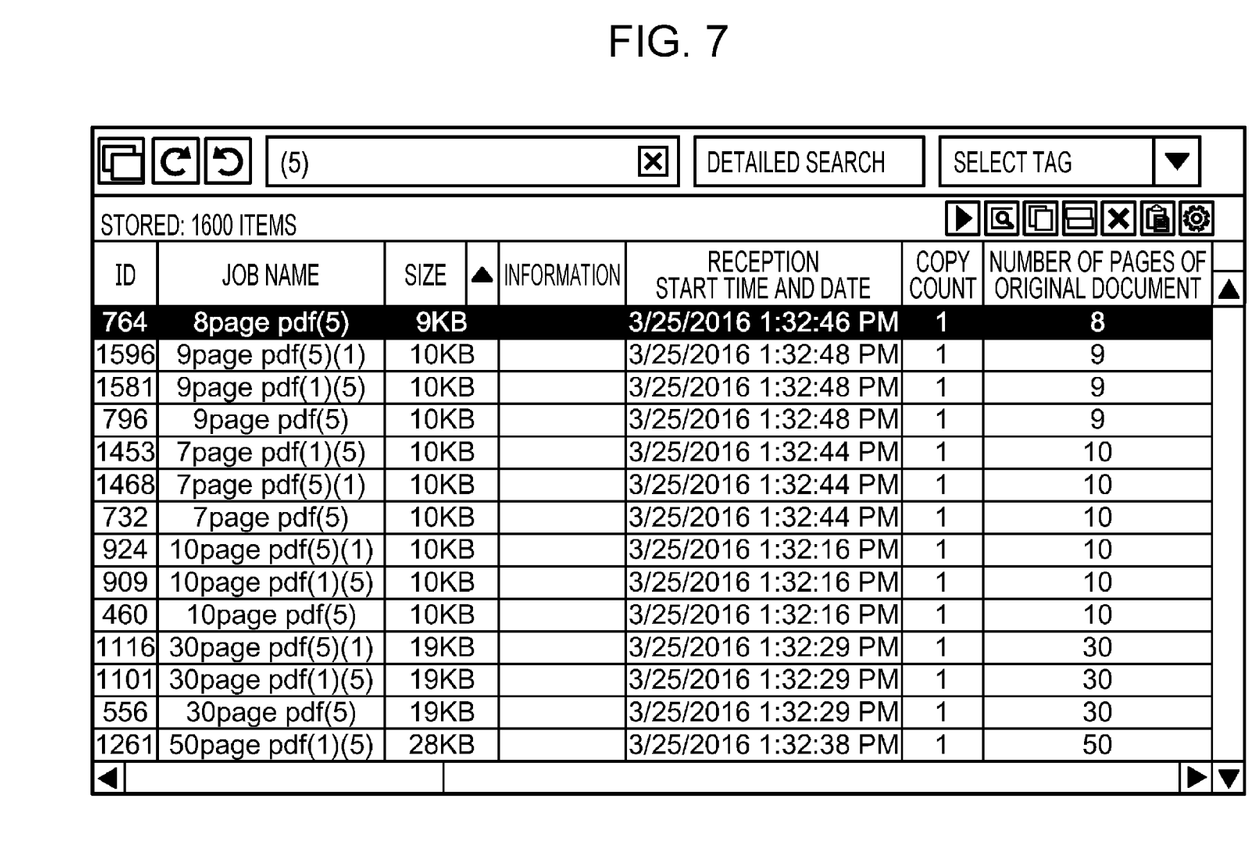
FIG. 7 illustrates an example of an updated display of the list.

FIG. 7 illustrates an example of an updated display of the list. In this example, the print command corresponding to ID "764" is selected step S02 (see FIG. 6), and "5" is set as the search criteria in step S03. In this case, the print command having a job name "5" is extracted in step S04. In this example, plural print commands including "5" as a job name are selected. If plural print commands satisfying the search criteria are extracted, the extracted print commands are arranged in the ascending order of the reception start time and date. If there are plural print commands having the same time and date, those print commands are arranged in the ascending order of the IDs.

If the controller 11 determines in step S07 that ID "764" is included in the list of search results, the controller 11 rewrites the selection state flag related to ID "764" as "1" in step S08, and locates the print command corresponding to ID "764" at the top of the list in step S09. When these operations have been completed, the controller 11 updates the display of the list in step S01 (see FIG. 7). The print command corresponding to ID "764" is displayed in reverse video in the same way as in FIG. 6. Alternatively, an appearance different from reverse video may be used. For example, characters may be displayed in bold font, or the background color may be changed. If a print command is selected before the list is updated, the display of the list is simply updated such that the state of the selected print command is maintained.

As described above, in accordance with the exemplary embodiment, if an item selected from the displayed list satisfies the search criteria that are received after the selection of the item, the display of the list is updated such that the state of the selected item is maintained on the list representing the search results obtained under the search criteria.

The exemplary embodiment may be modified as described below. Plural modifications may be combined.

First Modification

In accordance with the exemplary embodiment, the selected print command is located at the top of the list. Even if the list is scrolled, the selected print command may remain displayed. For example, if the list s scrolled, the controller 11 shifts downward plural listed print commands displayed one by one in raw, and locates the selected print command at the top of the display area. Alternatively, the selected print command may be located at the center row or at the lowermost row of the display area.

The selected print command may be located at the top of the list. The display area may be determined such that the selected print command comes to the top of the list with an arrangement position of the search results maintained. The arrangement position of the search results obtained under new search criteria which the selected print command satisfies is maintained, for example, by displaying the search results such that the "reception start time and date" serving as a list item is located in a descending order. Although there is a search result prior to the selected print command in this case, that result does not appear in the display area. To display that search result, the user may move the display area using a scroll bar. If the search results satisfying the search criteria fall within the display area of the list, the selected print command does not necessarily have to be located at the top of the list as long as the appearance thereof is different from that of the other print commands in the search results.

Second Modification

In accordance with the exemplary embodiment, the ID of the selected print command is stored on the RAM after associating the ID with the order information indicating the order according to which that ID is selected after the start of the list displaying process (see step S02). The print command may be located in accordance with the order information. In this arrangement, plural print commands are arranged in accordance with the order of selection if the plural print commands are selected.

More specifically, if the plural print commands are selected, a print command having the latest selection order from among the plural selected print commands is located at the top of the display area. In succession, the remaining print commands may be arranged in the order of lateness. In this arrangement, the item that is selected later is displayed with a higher priority.

Third Modification

In accordance with the exemplary embodiment, the ID of the selected print command is associated with the order information and then stored on the RAM as the selection information. The stored selection information may be deleted after the operation in step S01 or step S07.

Fourth Modification

In accordance with the exemplary embodiment, the list of the print commands stored on the spooler serves as an example of the list that is a target of the list displaying process. The lists serving as the target of the list displaying process may include any list output by the information processing apparatus. For example, the lists may include a list of the print commands executed by the printer 2, or a list of logs of processes performed by the print server 1.

Fifth Modification

In accordance with the exemplary embodiment, the selected print command is displayed in reverse video. Alternatively, the selected print command may have different color, different font, different size, or different thickness from the unselected print command. Alternatively, the selected print command may be tagged with a symbol, text, or graphics, each indicating that that print command has been selected.

Sixth Modification

In accordance with the exemplary embodiment, the function of the list displaying process is implemented using software. Part or whole of the function may be implemented using hardware. The software may be delivered by recording the software on a computer readable recording medium, such as an optical recording medium or a semiconductor memory, by reading the software from the recording medium and by installing the software onto a computer. The software may be delivered via a telecommunications line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a controller configured to act as:
        a first receiving unit that receives a selected item included in a list being displayed before the controller receives any setting of search criteria, the displayed list being a list of print commands that are stored in a spooler;
        a second receiving unit that receives a setting of search criteria; and
        an updating unit that updates, if the selected item satisfies the search criteria that are set after the item is selected, a display of the list such that search results obtained under the search criteria are displayed and that a state that the item is selected is maintained; and
        a display control unit that controls the display of the list so that a displayed order of the selected item is changed after the display of the list is updated by the updating unit and the selected item is displayed at the top of the list, the selected item being part of the search results.

2. The information processing apparatus according to claim 1, wherein the updating unit locates the selected item within a display area when the list is scrolled.

3. The information processing apparatus according to claim 1 further comprising a memory that stores selection information indicating the item selected by the first receiving unit, and
    wherein the updating unit deletes the stored selection information after updating the display of the list by referencing the memory.

4. The information processing apparatus according to claim 2 further comprising a memory that stores selection information indicating the item selected by the first receiving unit, and
    wherein the updating unit deletes the stored selection information after updating the display of the list by referencing the memory.

5. The information processing apparatus according to claim 1, wherein the updating unit performs interchanging between a color of characters in the selected item and a color of a background.

6. The information processing apparatus according to claim 4, wherein the updating unit performs interchanging between a color of characters in the selected item and a color of a background.

7. The information processing apparatus according to claim 1, wherein the updating unit arranges a plurality of items in accordance with a selection order if the first receiving unit has selected the plurality of items.

8. The information processing apparatus according to claim 2, wherein the updating unit arranges a plurality of items in accordance with a selection order if the first receiving unit has selected the plurality of items.

9. The information processing apparatus according to claim 3, wherein the updating unit arranges a plurality of items in accordance with a selection order if the first receiving unit has selected the plurality of items.

10. The information processing apparatus according to claim 4, wherein the updating unit arranges a plurality of items in accordance with a selection order if the first receiving unit has selected the plurality of items.

11. The information processing apparatus according to claim 5, wherein the updating unit arranges a plurality of items in accordance with a selection order if the first receiving unit has selected the plurality of items.

12. The information processing apparatus according to claim 6, wherein the updating unit arranges a plurality of items in accordance with a selection order if the first receiving unit has selected the plurality of items.

13. The information processing apparatus according to claim 7, wherein the updating unit displays an item with a higher priority as the item has been selected later in the selection order.

14. The information processing apparatus according to claim 8, wherein the updating unit displays an item with a higher priority as the item has been selected later in the selection order.

15. An information processing method comprising:
    receiving a selected item included in a list being displayed before receiving any setting of search criteria, the displayed list being a list of print commands that are stored in a spooler;
    then receiving a setting of search criteria;
    with the selected item satisfying the search criteria that are set after the item are selected, updating a display of the list such that search results obtained under the search criteria are displayed and that a state that the item is selected is maintained; and
    changing a displayed order of the selected item after the display of the list is updated so that the selected item is displayed at the top of the list, the selected item being part of the search results.

16. A non-transitory computer readable medium storing a program causing a computer to execute a process for processing information, the process comprising:
    receiving a selected item included in a list being displayed before receiving any setting of search criteria, the displayed list being a list of print commands that are stored in a spooler;
    then receiving a setting of search criteria;

with the selected item satisfying the search criteria that are set after the item are selected, updating a display of the list such that search results obtained under the search criteria are displayed and that a state that the item is selected is maintained; and changing a displayed order of the selected item after the display of the list is updated so that the selected item is displayed at the top of the list, the selected item being part of the search results.

17. The information processing apparatus according to claim 1, wherein the display control unit controls the display of the list so that at least one of the font and background color of the selected item is changed after the display of the list is updated by the updating unit.

18. The information processing apparatus according to claim 1, wherein the selected item is selected by a user operating a pointing device selected from at least one of a mouse, a touchpad, or a touchpanel.

19. The information processing method according to claim 15, wherein the selected item is selected by a user operating a pointing device selected from at least one of a mouse, a touchpad, or a touchpanel.

20. The non-transitory computer readable medium according to claim 16, wherein the selected item is selected by a user operating a pointing device selected from at least one of a mouse, a touchpad, or a touchpanel.

\* \* \* \* \*